United States Patent

Witt et al.

[11] 3,886,476
[45] May 27, 1975

[54] MULTI-STAGE SYSTEM

[75] Inventors: Donald L. Witt; Charles F. Staley, both of North Palm Beach, Fla.

[73] Assignee: United Aircraft Corporation, East Hartford, Conn.

[22] Filed: May 24, 1968

[21] Appl. No.: 733,219

[52] U.S. Cl.......... 331/94.5 G; 331/94.5 C; 330/4.3
[51] Int. Cl............................ H01s 1/06; H01s 3/02
[58] Field of Search...................... 331/94.5; 330/4.3

[56] References Cited
UNITED STATES PATENTS
3,801,927  4/1974  Allen ................................... 330/4.3

*Primary Examiner*—Richard A. Farley
*Assistant Examiner*—N. Moskowitz
*Attorney, Agent, or Firm*—Jack N. McCarthy

[57] ABSTRACT

A high power gas dynamics laser device having multiple expansion-diffusion stages for gas flow and multiple relection optic having a plurality of passes for the generation of laser power. The gaseous working fluid is provided by a combustion system. The combustion products are expanded through nozzles to obtain a population inversion and then a diffuser is used to recover the dynamic pressure. The gas flow follows four stages, the first three stages are single expander-diffuser units in series and the fourth stage is a larger sized stage having flow in two parallel expander-diffuser units. The nozzles of the first three stages are sized and contoured to obtain pressure in their laser cavities which are as equal as possible and the nozzle exit Mach. No. is made approximately equal.

10 Claims, 2 Drawing Figures

INVENTORS
DONALD L. WITT
CHARLES F. STALEY
BY Jack N. McCarthy
AGENT

MULTI-STAGE SYSTEM

BACKGROUND OF THE INVENTION

This invention relates to a gas dynamic laser system and especially to one of high power using multiple expansion-diffusion stages with multiple reflection optics for the generation of laser power.

SUMMARY OF INVENTION

This invention discloses a multi-stage gas dynamic laser of high power. A feature of the device is that the path of the working gas is in four stages, the first three stages are in series with each other and with a fourth stage which comprises a two-pass parallel stage. Since only a minor portion of the thermal energy is lost in the removal of the laser power, the gases may be expanded again and additional laser power obtained.

Another feature of this device is the equal laser cavity (nozzle exit) pressures of the first three stages which permits coupling without the need for windows between these stages. This equal cavity pressure feature, combined with the side-by-side configuration also reduces the number of reflectors required, thereby lowering the losses due to absorption in the reflectors.

The nozzles of the first three stages are sized and contoured to arrive at nozzle area ratios which will combine with inlet pressures to provide equal laser cavity pressures.

The optical path first traverses the optically long fourth stage and then with the increased intensity traverses the first three aerodynamic stages.

The formation of the fourth stage by a parallel flow system having two paths provides for compact packaging.

DESCRIPTION OF THE PREFERRED EMBODIMENT

Figure 1:
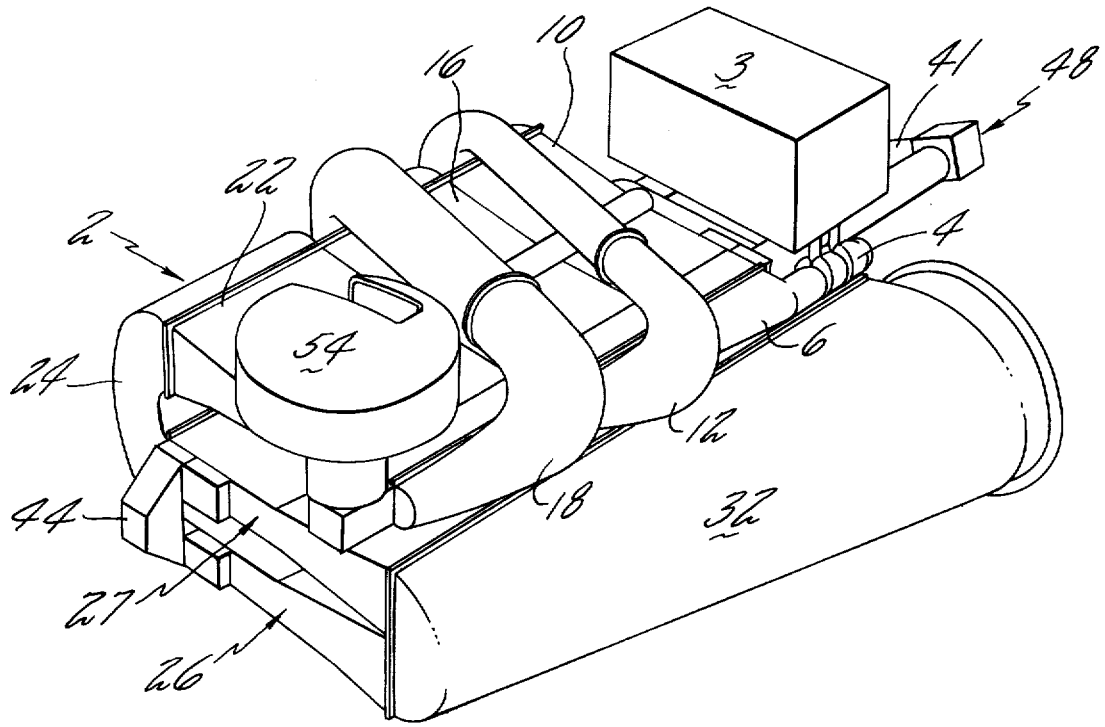
FIG. 1 is a perspective view of a multi-stage gas dynamic laser system utilizing the invention.

As shown in FIG. 1 the high power gas dynamic laser multi-stage device shows a four stage gaseous working fluid path and a three pass optical path through which the laser beam passes. A combustor 4, such as disclosed in application Ser. No. 733,220, filed herewith, to John Chamberlain for a Combustion Chamber Device, supplies the gaseous working fluid which contains the constituents necessary for a lasing action when expanded across a nozzle means. Propellant feed system components and control for combustor 4 is generally shown at 3. A nozzle means of this type showing a plurality of small nozzles is disclosed in application Ser. No. 729,484, filed May 10, 1968 to Richard C. Mulready.

The working fluid leaves the combustor 4 and is directed by a manifold 6 to a first expansion-diffusion stage. The fluid is expanded across a nozzle means 8 having a plurality of small nozzles. The fluid then passes through a diffuser 10 to a manifold 12 for re-entry into a second expansion-diffusion stage. The fluid is then expanded across a nozzle means 14 having a plurality of small nozzles. The fluid then passes through a diffuser 16 to a manifold 18 for re-entry into a third expansion-diffusion stage. The fluid is then expanded across a nozzle means 20 having a plurality of small nozzles. The fluid then passes through a diffuser 22 to a manifold 24 for re-entry into a fourth expansion-diffusion stage.

Figure 2:
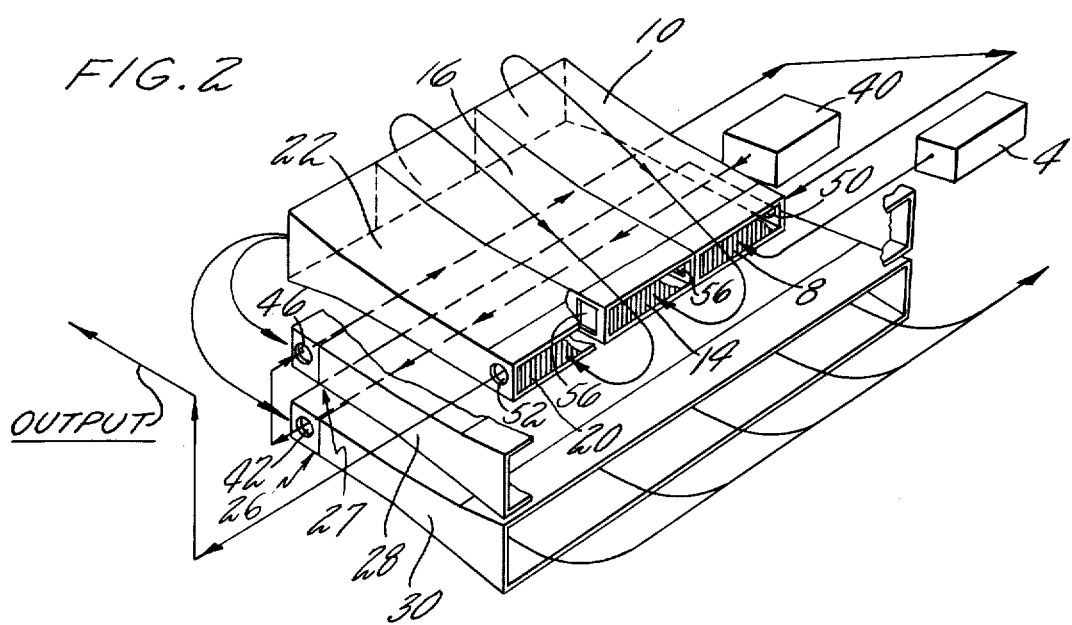
FIG. 2 is a schematic view showing the working gas flow path and the laser beam path.

While the first three expansion-diffusion stages have been in series as far as aerodynamic flow path is concerned, the fourth stage is a parallel stage having two expander-diffuser units 26 and 27, much larger than those of the first three units. The fluid is then expanded across a nozzle means (not shown) having a plurality of small nozzles extending the full length of each of the units 26 and 27. The fluid then passes through the parallel diffusers 28 and 30 to an exit manifold 32 for diffusion to atmosphere. In FIG. 2 flow lines are only shown from the diffuser 30 to prevent confusion in the drawing.

While the expander-diffuser units of the first three stages have flow directed therethrough in a series path, the units are located side by side facing the same direction with only a thin wall therebetween. The two expander-diffuser units 26 and 27 of the fourth stage are located one over the other and are both beneath the first three stages with the flow therethrough being directed in the opposite direction. This arrangement facilitates the construction of the optical system.

An oscillator 40 aims a laser beam through the laser cavity formed rearwardly of the nozzles of the expander-diffuser unit 26. The beam passes through a hole 42 in each side of the unit 26, an end optical cavity 44 reflects the beam to pass through the laser cavity formed rearwardly of the nozzle of the expander-diffuser unit 27. The beam passes through a hole 46 in each side of the unit 27.

An end optical system 48 reflects the beam to pass through the aligned series of laser cavities formed rearwardly of the nozzles 8, 14 and 20 of the expander-diffuser unit of the first three stages. The end optical system 48 contains optical devices which converge and re-expand the beam permitting a small hole in pipe 41 to pass the beam and at the same time limiting the gas flow which will tend to pass from the laser cavity behind nozzle 8 to the laser cavity between holes 46. The beam passes through a hole 50 in the outside of the expander-diffuser unit of the first stage and a hole 52 in the outside of the expander-diffuser unit of the third stage.

Between the inner sides of the laser cavities in the expander-diffuser units of the first three stages the side walls are open as at 56 to permit the beam to pass therethrough. The opening at these points is made possible in view of the construction of the nozzles 8, 14 and 20 which obtain nearly (very close) equal cavity pressures and approximately equal velocities, and the inline position of the expander-diffuser units with relation to the flow therethrough.

These pressures and velocities are obtained by varying the nozzle expansion ratio of successive stages to compensate for the pressure loss which occurs during the diffusion process and ducting the flow between stages. As stated, the side-by-side arrangement and like directional flow of the stages permits the use of a single side wall structure between stages as well as eliminating the need for an optical window to prevent flow between stages.

In a one megawatt unit typical system parameters could be as follows:

| Flow Stage | 1 | 2 | 3 | 4 |
|---|---|---|---|---|
| Flow Rate, lb/sec | 48* | 43* | 39 | 39 |
| Inlet Pressure, psia | 1700 | 600 | 300 | 70 |
| Nozzle Area Ratio | 36 | 17 | 10 | 15 |
| Nozzle Exit Mach. No. | 4.8 | 4.0 | 3.6 | 4.0 |
| Cavity Pressure, psia | 2.9 | 2.9 | 2.9 | 0.4 |

*Stages 1 and 2 have diffuser bleed flow to increase the pressure recovery efficiency of the diffuser. This reduces flow to the following stage.

It can be seen that with the combustor providing a flow rate of 48 lb/sec and a pressure of 1,700 psia to the first stage the cavity pressures will be equal.

A turret 54 is located at the side of the third stage and reflects the beam to form an output beam for aiming at any desired point. A turret of this type is shown in application Ser. No. 733,223, filed in the name of John I. Caporini and William A. Morton for a Turret Device.

It is to be understood that the invention is not limited to the specific description above or specific figures shown, but may be used in other ways without departure from its spirit as defined by the following claims.

We claim:

1. A gas dynamic laser device having a plurality of stages for working gas flow, a first stage having first nozzle means for expanding a working gas flow into a first laser cavity and a first diffuser, a second stage having second nozzle means for expanding a working gas flow into a second laser cavity and a second diffuser, said first and second stages being placed side by side with flow therethrough in the same direction, a manifold connecting the outlet of said first diffuser with the inlet of said second nozzle means, means for directing a laser beam through said laser cavities which are located side by side, the sides of said laser cavities adjacent each other being open into each other since the pressure in adjacent laser cavities are maintained equal by sizing said first and second nozzle means.

2. A combination as set forth in claim 1 wherein said second nozzle means has a predetermined expansion ratio which is matched to that of the first nozzle means so that the pressure at the exit of both of the nozzles is the same.

3. A combination as set forth in claim 1 wherein said first nozzle means has an expansion ratio of 36 and said second nozzle means has an expansion ratio of 17.

4. A combination as set forth in claim 1 wherein another downstream stage is formed having a two passage parallel flow, said downstream stage being located below said other stages with the flow therein going in the opposite direction.

5. A combination as set forth in claim 4 wherein each passage has a nozzle means expanding into a laser cavity and a diffuser, said means for directing a laser beam directs it first through the laser cavities of said passages before said laser cavities of said first and second stages.

6. A gas dynamic laser device having a plurality of gas dynamic lasers in series flow with one stage being a plurality gas dynamic lasers in parallel; each gas dynamic laser having a nozzle means, laser cavity and diffuser; said gas dynamic lasers in series flow being located side by side with the flows therein going in the same direction; said gas dynamic lasers in parallel being located one over the other below the series flow lasers which are side by side; working fluid passing through said series flow lasers first and then through said parallel flow lasers; a laser beam passing through the laser cavities of said parallel flow laser first and then through the laser cavities of said series flow lasers.

7. A combination as set forth in claim 6 wherein the laser beam passes through the laser cavities of said parallel flow lasers in series.

8. A combination as set forth in claim 6 wherein the laser cavities of adjacent gas lasers have an open area therebetween for passage of the laser beam.

9. A combination as set forth in claim 8 wherein the nozzle means of the gas lasers in series have predetermined expansion ratios to provide a constant pressure in the adjacent connected laser cavities.

10. A combination as set forth in claim 6 having connecting manifolds to the gas lasers in series having a predetermined pressure drop.

* * * * *